W. F. GROENE.
MILLING MACHINE.
APPLICATION FILED AUG. 17, 1917.

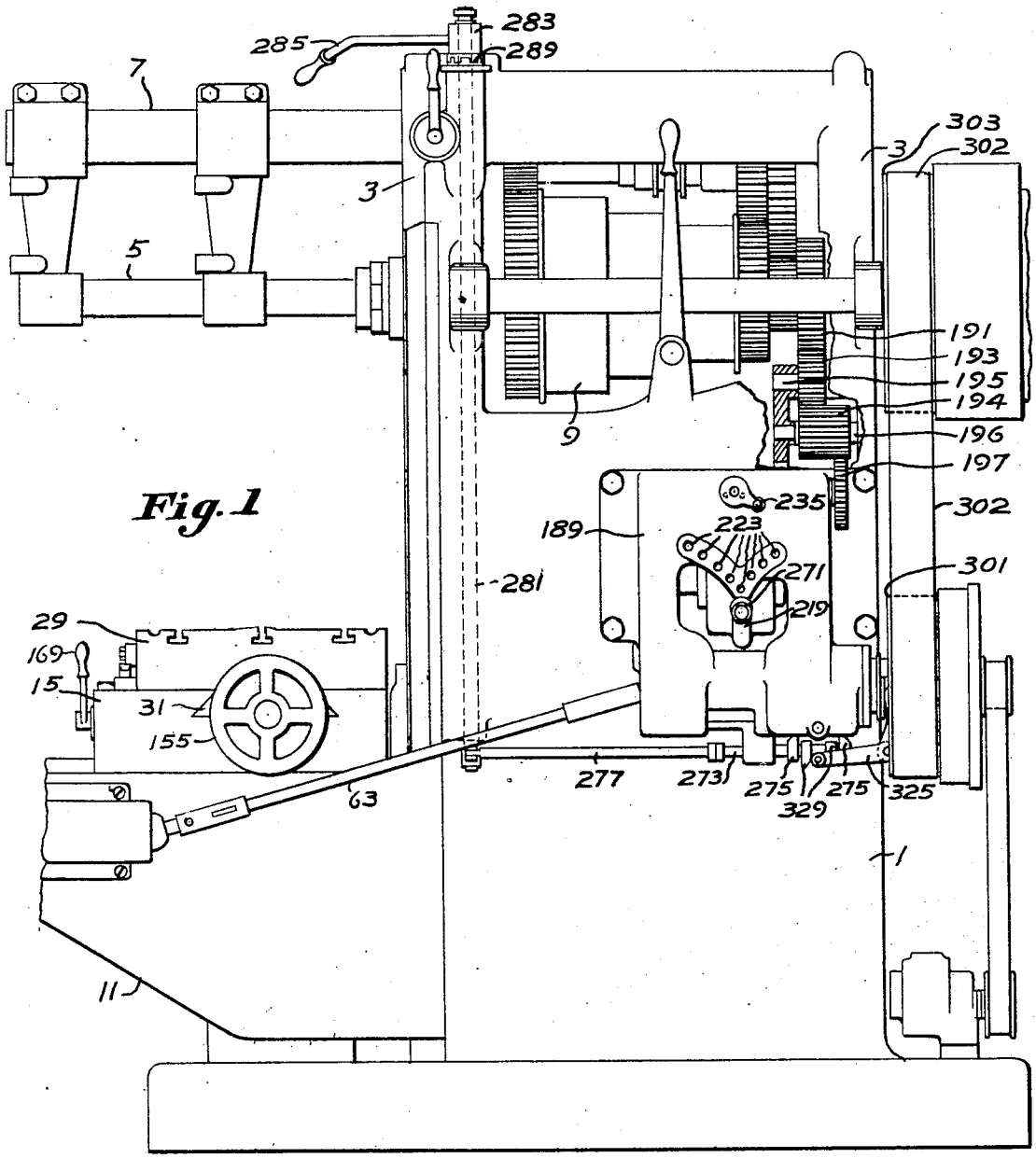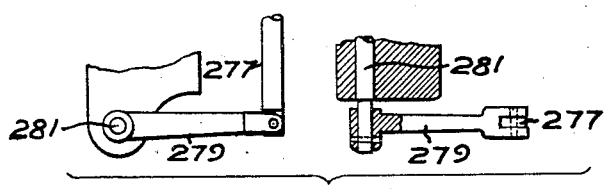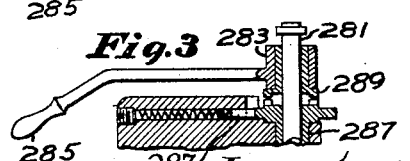

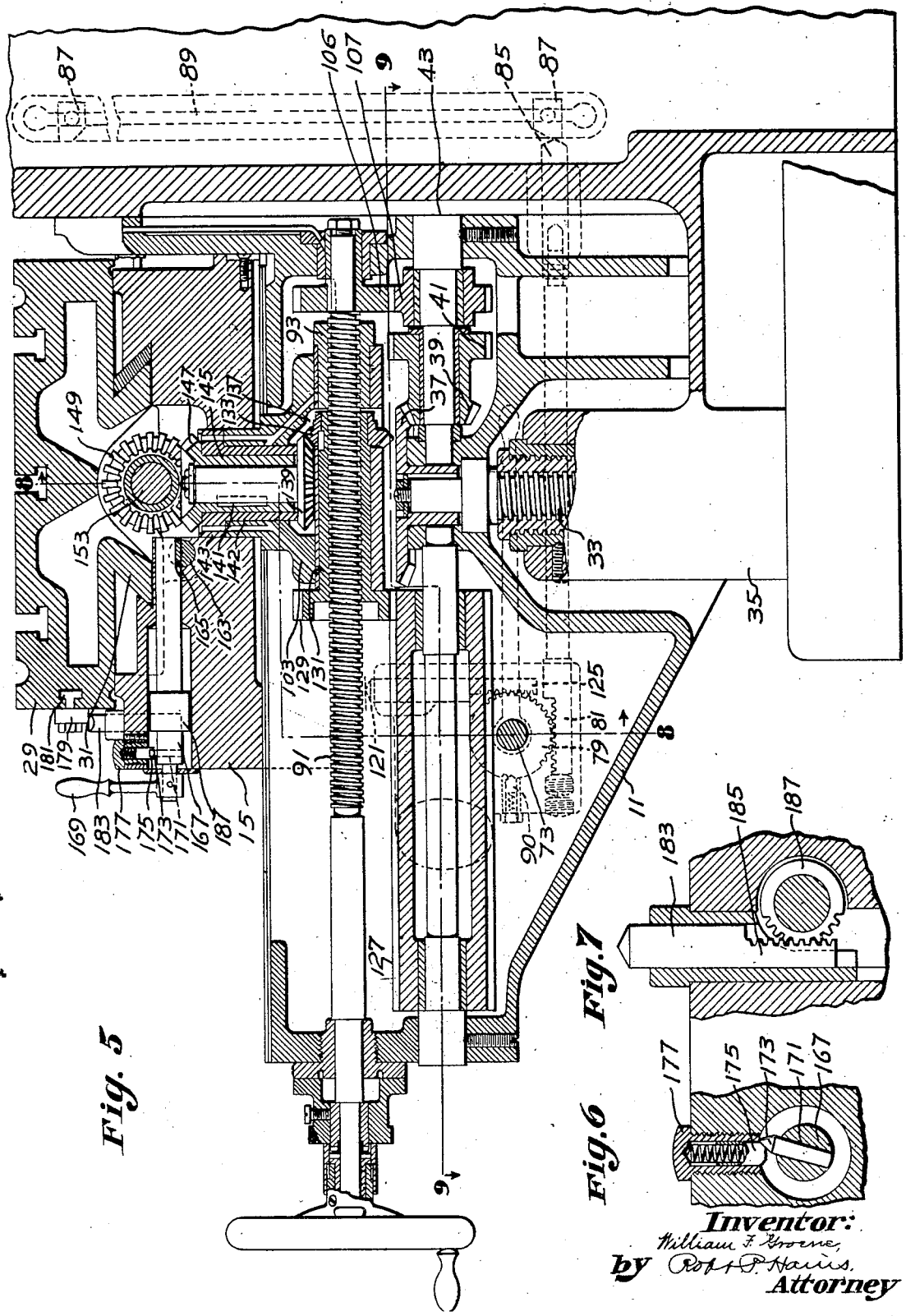

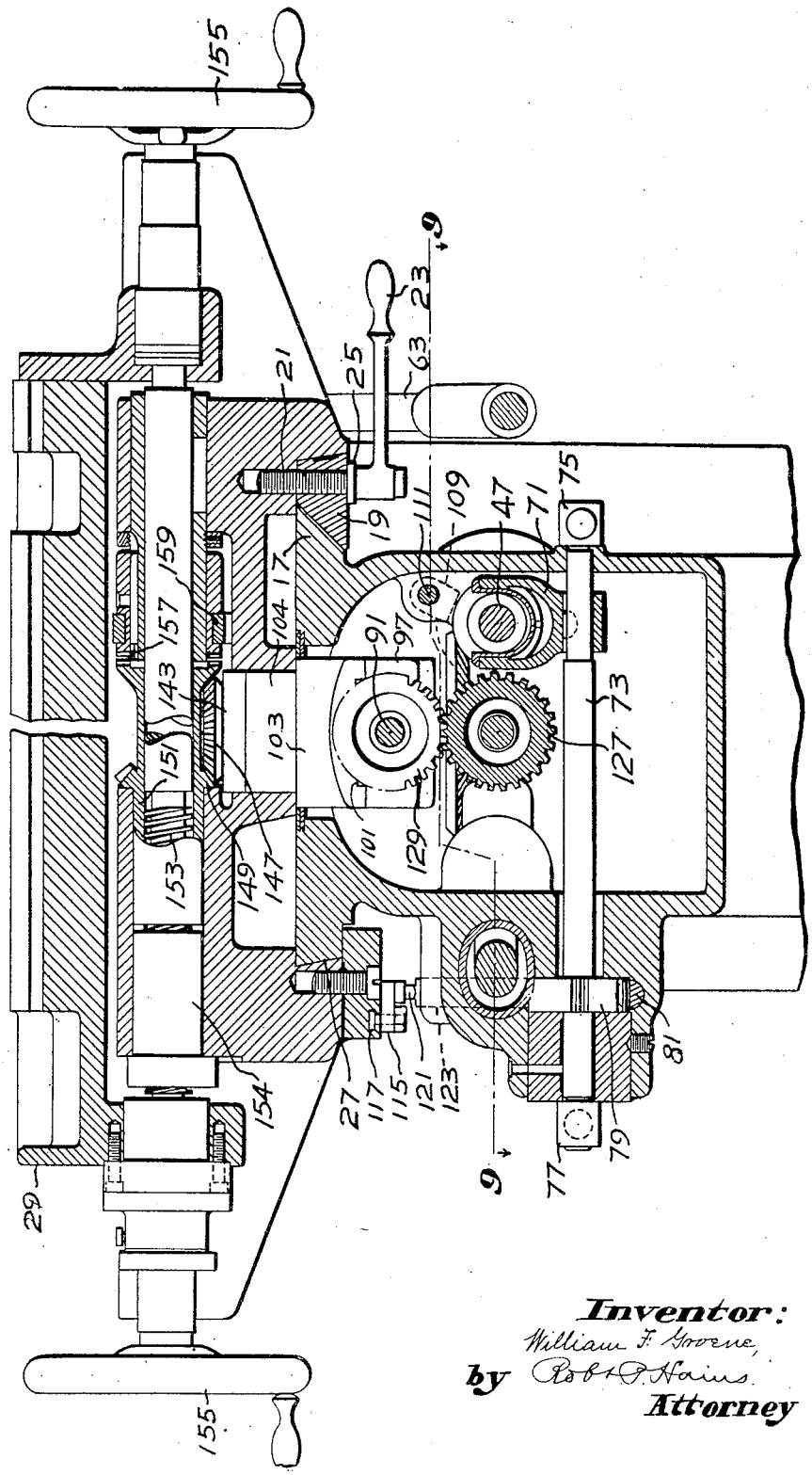

1,316,230.

Patented Sept. 16, 1919.
7 SHEETS—SHEET 4.

Inventor:
William F. Groene,
by Robt. F. Hains
Attorney

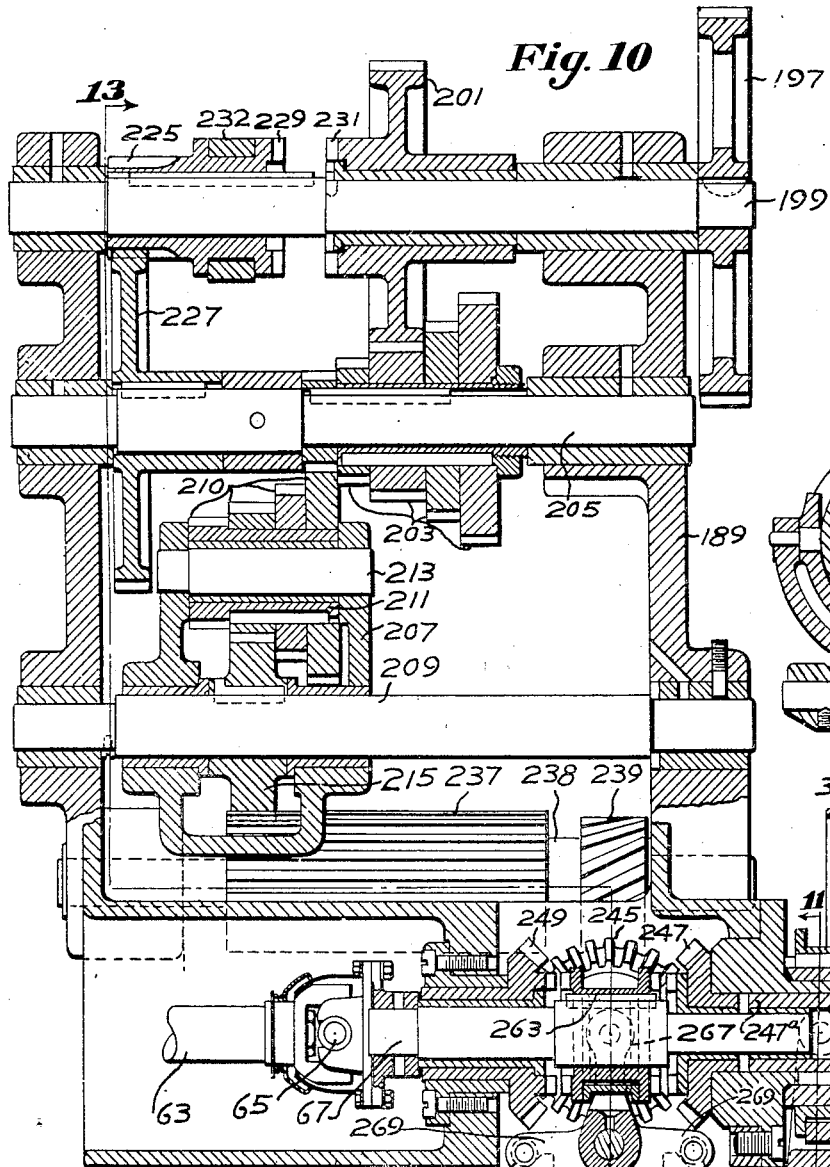
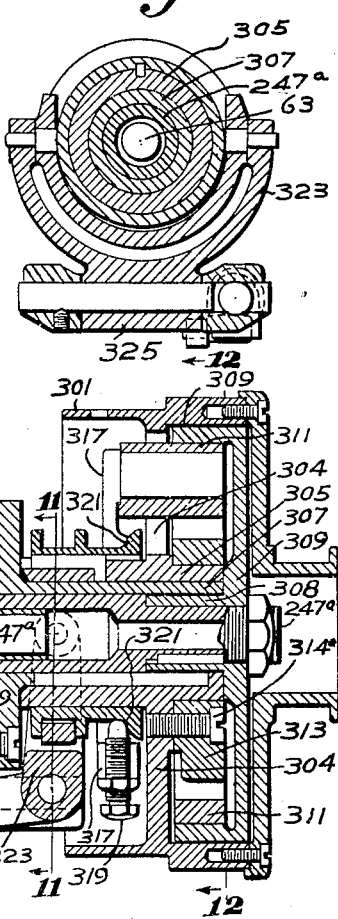
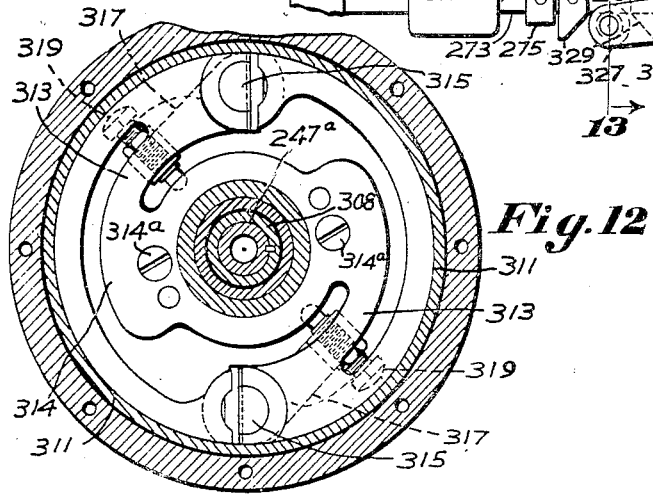

W. F. GROENE.
MILLING MACHINE.
APPLICATION FILED AUG. 17, 1917.

1,316,230.

Patented Sept. 16, 1919.
7 SHEETS—SHEET 6.

Inventor:
William F. Groene,
by Robt. D. Hains
Attorney

W. F. GROENE.
MILLING MACHINE.
APPLICATION FILED AUG. 17, 1917.

1,316,230.

Patented Sept. 16, 1919.
7 SHEETS—SHEET 7.

Inventor:
William F. Groene
by Robt. O. Harris
Attorney

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF OHIO.

MILLING-MACHINE.

1,316,230.     Specification of Letters Patent.     Patented Sept. 16, 1919.

Application filed August 17, 1917. Serial No. 186,709.

*To all whom it may concern:*

Be it known that I, WILLIAM F. GROENE, a citizen of the United States, residing at Cincinnati, county of Hamilton, and State of Ohio, have invented an Improvement in Milling-Machines, of which the following description, in connection with the accompanying drawings, is a specification, like characters on the drawings representing like parts.

The invention hereinafter described relates to milling machine and other machine tools.

Machines of this type usually comprise a standard supporting a knee, saddle and table. The knee may be fed vertically along the standard, and the saddle and table may be fed transversely to one another on the knee.

One of the objects of the invention is to provide improved speed change mechanism for feeding the knee, saddle and table, or any of them, at different speeds appropriate for operation of the tool on the work; and means for imparting a rapid traverse thereto, to carry the work quickly to positions in readiness for the operations of the tool on the work. This rapid traverse may be obtained independently of the speed change mechanism, without disturbing the adjustment of said mechanism and without imposing the burden of the rapid feed on said mechanism.

Another object of the invention is to provide a simple and readily operated means whereby the direction of feed of the knee, saddle and table, or any of them, may be controlled, and the working feed and rapid traverse may be alternatively brought into action.

Another object is to provide improved means for feeding the saddle along the knee, and means for transmitting the feed to the table through the saddle, suitable for a plain machine or a universal machine having a swiveled saddle.

Another object is to provide a compact mechanism for feeding the knee and saddle whereby the knee and saddle may be selectively fed and under the control of a single clutch for starting and stopping the feeds.

Another object is to provide a simple and effective mechanism for automatically arresting the knee, saddle and table feeds.

And still another object is to provide improved means for securing the saddle to the knee in different positions of adjustment.

With the aforesaid and other objects in view, the character of the invention may be best understood by reference to the following description of one good form thereof shown in the accompanying drawings, wherein:—

Figure 1 is a side elevation of the machine shown herein as embodying the invention;

Fig. 2 is a plan detail of a hand lever device for controlling the feed by the work feed mechanism and the rapid traverse mechanism and controlling the direction of feed by either mechanism;

Fig. 3 is a vertical section through parts shown in Fig. 2;

Figure 9:
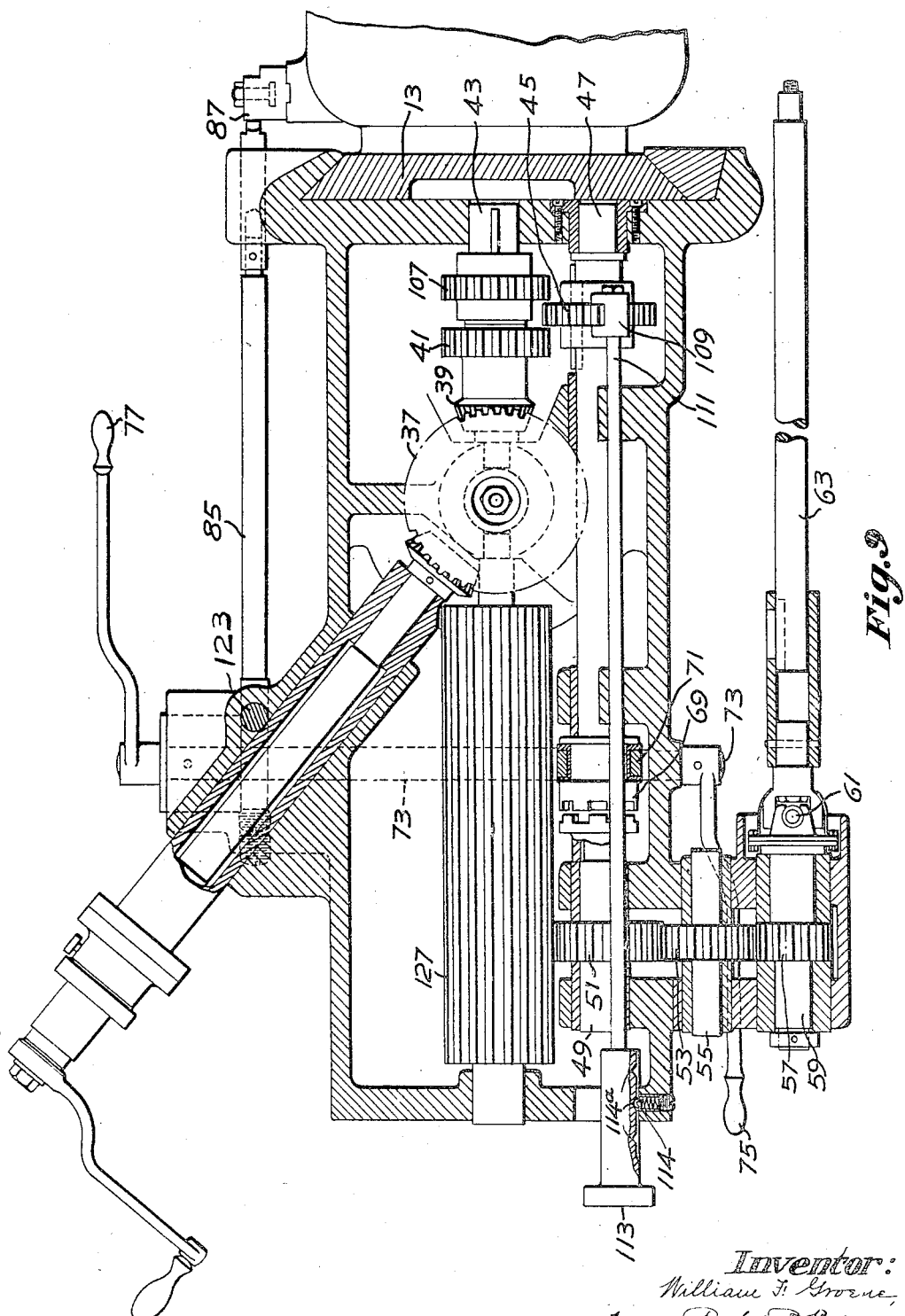
Figure 14:
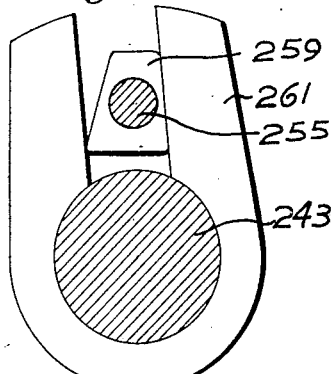
Figure 13:
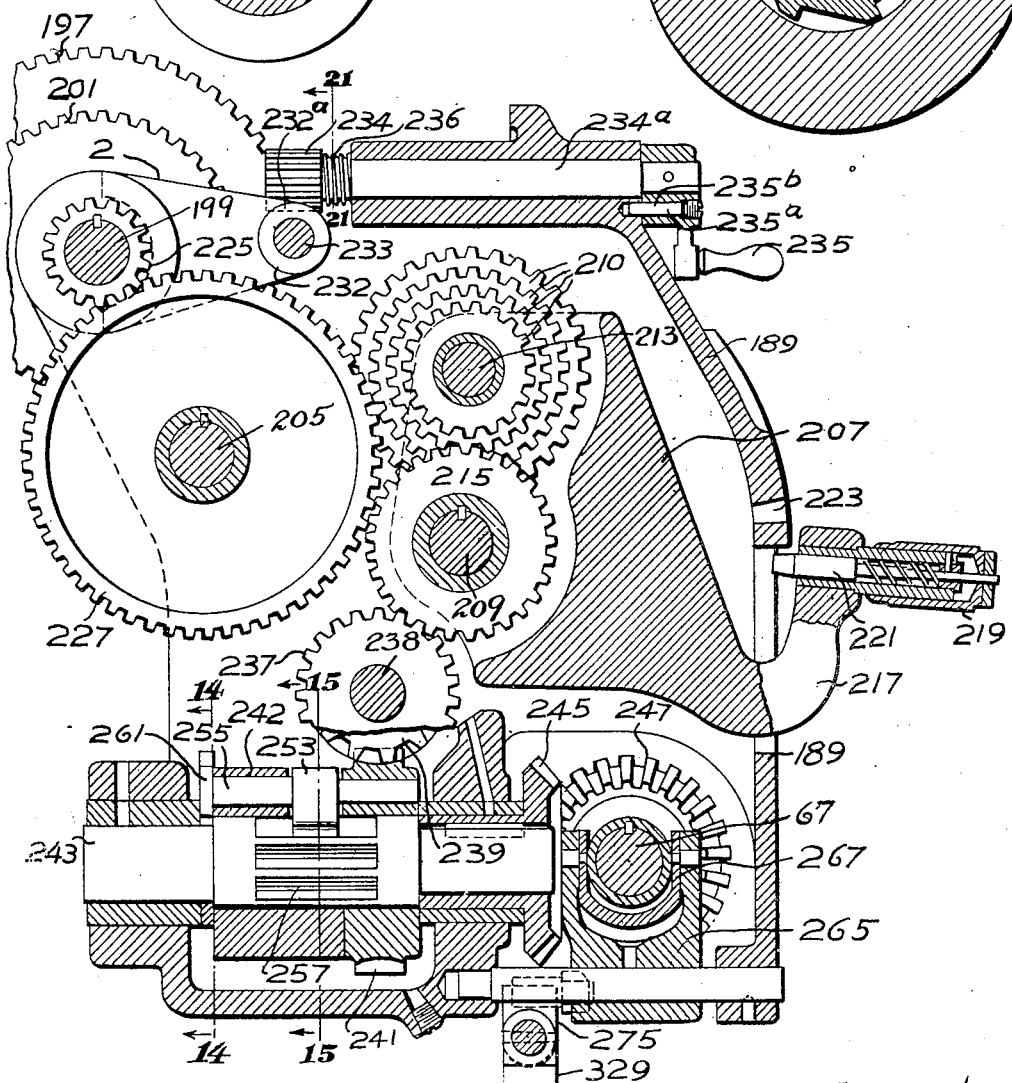

Figs. 3ª and 3ᵇ are details to be referred to;

Fig. 4 shows the details of the connections between the hand lever and the devices operated thereby;

Fig. 5 on an enlarged scale is a vertical section disclosing the mechanism carried by the knee;

Fig. 6 on an enlarged scale is a sectional detail of a device for holding an actuating shaft for the table feed clutch in different positions;

Fig. 7 is a sectional detail showing a rack plunger and toothed sector forming part of the means for transmitting movement from the table to the feed clutch therefor;

Fig. 8 is a vertical section taken on line 8—8 of Fig. 5;

Fig. 9 is a horizontal section taken on line 9—9 of Figs. 5 and 8;

Fig. 10 on an enlarged scale is a vertical section through the speed change mechanism and rapid traverse mechanism carried by the feed box on the standard;

Fig. 11 is a vertical section taken on line 11—11 of Fig. 10;

Fig. 12 is a vertical section taken on line 12—12 of Fig. 10;

Fig. 13 is a vertical section taken on line 13—13 of Fig. 10;

Fig. 14 on an enlarged scale is a detail section taken on line 14—14 of Fig. 13.

Figure 15:
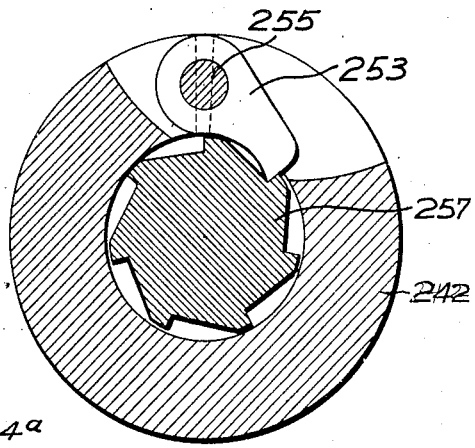
Figure 16:
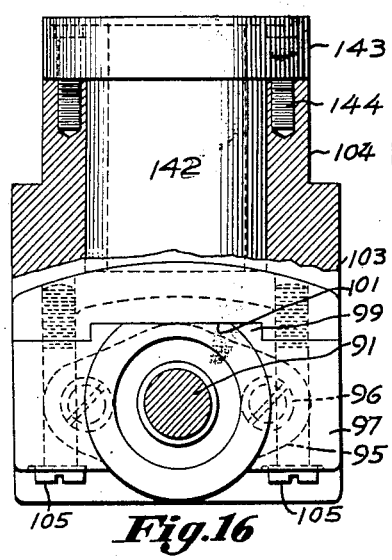
Figure 17:
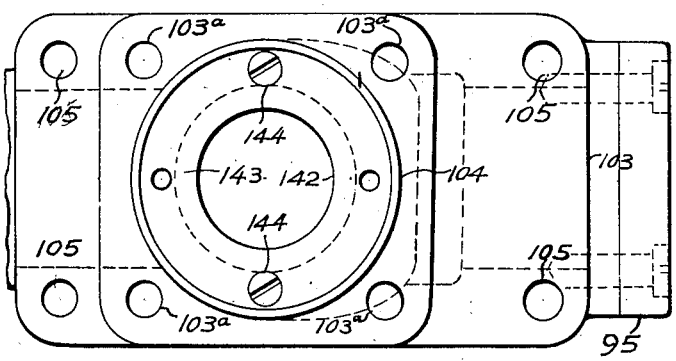
Figure 18:
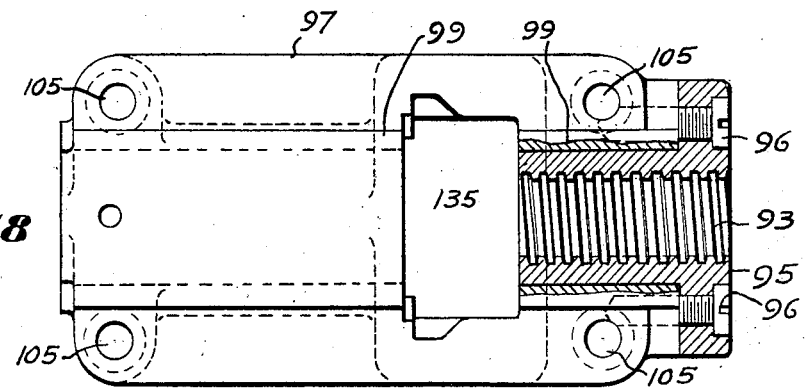
Figures 19, 20, 21:
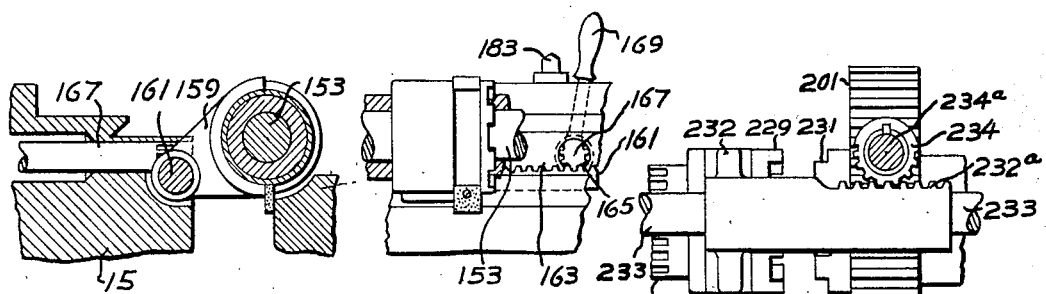

Fig. 15 on an enlarged scale is a detail section taken on line 15—15 of Fig. 13;

Fig. 16 is a view partially in elevation and partially in vertical section through the bracket and the box connected thereto for transmitting movement from the saddle feed screw to the saddle;

Fig. 17 is a plan of the parts shown in Fig. 16;

Fig. 18 is a plan of the box connected with the bracket;

Fig. 19 is a transverse section showing the yoke and devices coöperating therewith for shifting the clutch to control the starting and stopping of the table feed;

Fig. 20 is a view disclosing parts of the mechanism for controlling the yoke shown in Fig. 19; and Fig. 21 is a vertical section taken on line 21—21 of Fig. 13.

Referring to the drawings, the machine shown therein as embodying the invention comprises a standard 1 (Fig. 1) having the uprights 3 thereon provided with bearings in which is journaled the usual tool actuating spindle 5. An arm 7 may be secured in said uprights adjacent the upper ends thereof and projects beyond one side of said standard to provide an outboard bearing for said spindle. A cone pulley 9 mounted on said spindle may be driven by a belt (not shown) in the usual manner.

To support the work in appropriate relation to the tool on the spindle, a knee 11 may be provided having a dovetail groove adapted to receive a dove-tail projection 13 on said standard, so that the knee may be fed vertically as desired.

A saddle 15 is mounted on said knee and is guided by a dove-tail projection 17 (Fig. 8) and a groove in said saddle. The saddle may be fed along the knee by means to be described, and be held in different positions of adjustment. To secure the saddle to the knee, a gib 19 may be provided, preferably wedge-shaped in section, located between said dove-tail projection and an edge of said groove. To secure this gib in place, screws 21 are entered therethrough and threaded to the saddle.

Handles 23 are secured to said screws and have hubs bearing against washers 25 between said hubs and said gib. When the screws are adjusted by the handles, the gib will be pressed slightly upwardly, thereby shifting the saddle slightly toward the right of said figure on said knee. The opposite edges 27 of the dove-tail projection and groove have a sharp pitch angle, such, that on the slight lateral movement of the saddle referred to, the latter will be drawn down and bear securely against the upper surface of the knee. Thus, by the simple adjustment of the gib, the opposed bearing surfaces of the saddle and knee are brought securely together and locked. When it is desired to feed the saddle along the knee, the gib screws may be released somewhat, thereby permitting free sliding movement of the saddle along the knee.

A table 29 is mounted on the saddle and is guided by a dove-tail projection 31 on the table received by a similarly shaped groove in the saddle.

Next will be described means for elevating and lowering the knee. To accomplish this, a screw 33 (Fig. 5) may be mounted in a bearing 35 on said standard beneath said knee. A bevel gear 37 fast on said screw meshes with a bevel pinion 39 fast on the hub of a driving gear 41 journaled on a horizontal shaft 43 mounted in the knee.

To rotate said driving gear at the times desired, a shiftable gear 45 (Fig. 9) may be mounted on and splined to a horizontal driving shaft 47 journaled in bearings in the knee. This shaft extends toward the front of the knee, at one side of the knee feed screw, in line with a short shaft 49 journaled in bearings in said knee. A gear 51 fast on said short shaft is driven by an intermediate gear 53 on a shaft 55 journaled in bearings in said knee; said intermediate gear being driven in turn by a pinion 57 on a shaft 59 journaled in bearings in said knee. The latter shaft is connected by a knuckle 61 to one end of a telescopic extensible shaft 63, the opposite end of which is connected by a knuckle 65 with a short shaft 67 (Fig. 10) mounted on the standard and driven as more fully hereinafter described. This will permit the mechanism carried by the knee to be driven from the shaft on the standard in any position of vertical adjustment of the knee, or while the knee is fed vertically along the standard.

Next will be described means for starting and stopping the driving of the feed screw for the knee. To accomplish this, a clutch 69 (Fig. 9) is provided to connect the shiftable gear carrying shaft and the short shaft in line therewith. When this clutch is closed, the drive will be complete from the extensible shaft through the shiftable gear to the driving gear for the bevel gears for rotating the feed screw of the knee. When the clutch is open, the driving train for the knee will be interrupted and the movement of the knee will be arrested.

To control the clutch, the yoke 71 (Figs. 8 and 9) is connected to the clutch and is mounted on a long shaft 73 journaled in bearings in the knee. The opposite ends of this shaft project somewhat beyond the sides of the knee and receive handles 75 and 77 conveniently accessible to the operator for the purpose of manually opening and closing the clutch. The clutch may also be operated automatically by the travel of the knee. To accomplish this, a gear 79 (Fig. 5) may be mounted on said shaft 73 and mesh with a rack bar 81 mounted in the knee and projecting rearward toward the standard, where it presents a tapered end 85 (Fig. 5) adapted to be engaged by a pair of dogs 87 secured by screws in a T-shaped slot 89 extending longitudinally of the standard. These dogs may be adjusted and held at points desired to determine the extent of feed of the knee. The knee will travel until the tapered end of the rack bar strikes one or the other of these dogs, and then said bar will be shifted outward, thereby turning the gear on the shaft 73 and rocking the yoke to open the clutch and arrest the knee. The gear 79 may be held in its positions by a spring pressed plunger 90 (Fig. 5).

Next will be described means for feeding the saddle along the knee. In the present instance of the invention, the means for accomplishing this comprises a horizontal feed screw 91 (Fig. 5) journaled in bearings in said knee and confined against axial movement. A nut 93 receives said feed screw and has a head 95 (Figs. 17 and 18) secured by screws 96 to one end of a box 97 having a top projection 99 (Fig. 16) received by a groove 101 in the lower end of a bracket 103 having a sleeve 104 projecting upwardly into a vertical bore in the saddle. The box crosses the lower end of the bracket and is secured thereto by screws 105, and the bracket is secured to the saddle by screws entering tapped holes 105ª in the bracket. The construction is such that feeding connections are provided between the feed screw and the saddle which are strong in construction and easily assembled. Also, it has the advantage of being suitable for a plain milling machine or a universal machine in which the saddle swivels on the knee.

To rotate the saddle feed screw, a gear 106 (Fig. 5) is mounted fast thereon adjacent one end thereof, meshing with an intermediate gear 107 loose on the shaft 43 carrying the driving gear for the knee feed screw.

The shiftable gear 45, referred to, not only serves to transmit rotation to the knee feed screw, but also to transmit rotation to the saddle feed screw. To accomplish this, it is merely necessary to slide the shiftable gear along its shaft out of engagement with the driving gear for the knee feed into engagement with the driving gear for the saddle feed. To slide the shiftable gear, it may be connected by a fork 109 (Figs. 8 and 9) with a horizontal rod 111 slidably mounted in the knee and extending toward the front of the latter, where it is provided with a handle or knob 113. When the knob is pulled outward, it will cause the shiftable gear to mesh with the driving gear for the knee feed, and when the knob is pushed inward it will cause the shiftable gear to mesh with the driving gear for the saddle feed. It will be noted that this knob is located at the front of the knee where it is conveniently accessible to the operator of the machine. The rod 111 is held in its position of adjustment by a spring pressed ball 114 adapted to enter notches 114ª in the handle hub.

By the mechanism described, the horizontal shaft carrying the shiftable gear may be mounted at one side of the knee feed screw and in the same horizontal plane with the shaft carrying the driving gear for said feed screw. Consequently, the saddle feed screw may be located down closely adjacent to the top of the knee feed screw. As a result, the feeding mechanism for the knee and saddle are arranged in very compact organization, enabling reduction in the height of the saddle and thereby lengthening the available extent of vertical feed of the knee without increasing the height of the standard.

Next will be described means for controlling the starting and stopping of the saddle feed. To accomplish this, the saddle may be provided with dogs 115 secured by screws in a T-slot 117 extending longitudinally of said saddle. These dogs are adapted to engage the tapered end 121 (Figs. 5 and 8) of a plunger 123 having a rack 125 meshing with the gear operating the yoke for shifting the clutch 69 referred to in the driving train for the knee feed screw.

Thus, by the simple addition of these elements, means is provided for automatically shifting said clutch by the movement of the saddle. Also, it will be noted that the same clutch may serve to arrest either the knee feed or the saddle feed. One or the other will be arrested, depending on whether the shiftable gear is adjusted to complete the drive for the knee feed or for the saddle feed.

Having described the knee feed, the saddle feed and the controlling means therefor, next will be described the means for feeding the table along the saddle. To accomplish this, a wide face gear 127 (Fig. 5) is mounted on a shaft journaled in bearings in the knee and is driven by the gear 51 (Fig. 9) referred to in the driving train for the knee and saddle feeds. A gear 129 meshes with said wide face gear and is mounted on one end of a sleeve shaft 131 receiving the saddle feed screw and journaled in the box 97, referred to, carried by the saddle bracket. A bevel gear 133 is mounted on the opposite end of said sleeve shaft and projects through an opening 135 (Fig. 18) in said box into a recess 137 (Fig. 5) in said bracket receiving a bevel gear 139 meshing with the bevel gear 133. The bevel gear 139 is fast on the lower end of a shaft 141 in a bushing 142 (Figs. 5 and 16) in said bracket having a flange 143 at the upper end thereof secured by screws 144 to the upper end of said bracket sleeve. A sleeve shaft 145 is mounted between the bushing 142 and the shaft 141 and keyed to the latter. At the upper end of said sleeve shaft 145 is a bevel gear 147 meshing with a bevel gear 149 (Fig. 8) on a sleeve shaft 151 journaled in a bearing in said saddle and confined against axial movement therein. A feed screw 153 projects through said sleeve shaft and is threaded in a nut 154 fast in said saddle. The ends of the feed screw are journaled in bearings at the ends of the table and confined against axial movement therein. The feed screw may be rotated by hand wheels 155 fast on the opposite ends thereof.

To drive said feed screw by power, a clutch 157 is provided splined to said feed screw and shiftable axially thereof into locking engagement with the end of the hub of the bevel gear, referred to. To shift this clutch a yoke 159 (Figs. 5, 19 and 20) is connected to said clutch and to one end of a slidable bar 161 mounted in the saddle and having a rack 163 at the opposite end thereof. This rack meshes with a toothed sector 165 on one end of a shaft 167 journaled in bearings in said saddle and extending transversely to said rack bar toward the front of the table, where it receives a handle 169. By rocking this handle, the clutch may be opened and closed to drive or arrest the table as desired.

To hold the handle shaft in its different positions of adjustment, a pin 171 (Figs. 5 and 6) may be driven therein and have a tapered end 173 adapted to be engaged by a spring-pressed plunger 175 mounted in a recess in a plug 177 threaded into said saddle.

The feed screw for the table may also be arrested by movement of the latter. To accomplish this, a pair of dogs 179 may be secured in different positions of adjustment to the table by screws entering a T-slot 181 extending longitudinally of the table. A plunger 183 (Fig. 7) is mounted in said saddle and has a rack 185 meshing with a toothed sector 187 fast on the handle actuated shaft referred to.

When the table has traveled sufficiently, one or the other of its dogs will engage and depress the rack plunger, thereby rotating the shaft, opening the clutch, and arresting the feed of the table.

By the construction described, the knee, saddle and table may be traversed in opposite directions as desired, and the extent of feed thereof may be controlled manually by the hand operated levers for operating the clutches for arresting the feeds. If the clutches are not manually operated before the limits of the feeds are reached, the dogs will automatically shift the clutches and limit the feeds.

Having described the mechanism carried by the knee, next will be described speed change mechanism, whereby the feed screws of the knee, saddle and table, or any of them, may be driven at various speeds. In the present instance of the invention, this speed change mechanism is mounted in a box 189 (Figs. 1, 10 and 13) mounted on and secured to the standard. This speed change mechanism may be conveniently driven from the tool spindle referred to. To this end, a gear 191 (Fig. 1) is mounted fast on said spindle and drives intermediate gears 193 and 194 mounted on shafts 195 and 196 journaled in bearings on said standard. The latter gear meshes with a driver gear 197 (Fig. 10) fast on a shaft 199 journaled in bearings in said box.

A gear 201 loose on said shaft meshes with one of a series of different sized gears 203 fast on a shaft 205 parallel with the shaft 199 and journaled in bearings in said box.

A sliding tumbler 207 is adapted to slide along and rotate on a shaft 209 parallel with the shafts 199 and 205 and journaled in bearings in said box. This tumbler carries a series of different sized gears 210 fast on a stud shaft 213 secured to said tumbler. One of the different sized gears 210 drives a pinion 215 splined to slide on the shaft 209 on which the tumbler is mounted. The tumbler has an arm 217 (Fig. 13) projecting through an opening in the front of the box and provided with a handle 219 containing a spring pressed pin 221 adapted to enter any of a series of holes 223 in the box to hold the tumbler in its different positions of adjustment.

By the construction described, the tumbler may be shifted rotatively and axially to bring its different sized gears selectively into mesh with the different sized gears 203, referred to, thereby providing different working speeds for the feed screws of the knee, saddle and table.

To double the number of speeds obtained by the different sized gears carried by the tumbler, a pinion 225 (Figs. 10 and 21) may be splined to the shaft 199 and mesh with a gear 227 fast on the shaft 205. The pinion 225 has a long hub provided with clutch teeth 229 adapted to engage clutch teeth 231 on the hub of the gear 201. The pinion hub may be moved axially to open or close said clutch by a yoke 232 (Fig. 21) connected to said hub and adapted to slide along a rod 233 secured in the box. The yoke has a hub with gear teeth 232ª thereon meshing with a toothed sector 234 on one end of a shaft 234ª journaled in a bearing in the box and having a handle 235 (Fig. 13) at the opposite end thereof. The handle is held in its different positions by a pin 235ª thereon adapted to enter holes 235ᵇ in the face of the box, said pin being yieldingly held in said holes by a coil spring 236 encircling said shaft and confined between one end of its bearing and said pinion.

When the clutch is shifted to the right of Fig. 10, it will connect the gear 201 with the shaft 199, and disconnect the pinion 225 from the gear 227. As a result, the different size gears will be driven from the gear 201.

When the clutch is shifted to the left of Fig. 10, it will open to disconnect the gear 201 from its shaft, and will bring the pinion 225 into mesh with the gear 227. As a result, a speed slower than that obtained by the gear 201 will be imparted to the different size gears.

The pinion 215 driven by the different size gears and carried by the tumbler meshes with a wide faced gear 237 on a shaft 238 parallel to the tumbler shaft and journaled in bearings in the box. This wide faced gear is of sufficient extent to permit the tumbler pinion to remain in mesh therewith in all of the adjustments of the tumbler. The wide faced gear shaft carries a spiral gear 239 fast thereon meshing with a spiral gear 241 (Fig. 13) having a wide faced hub 242 loosely secured thereto and journaled on a short shaft 243 beneath and extending transversely to the wide faced gear shaft and journaled in bearings in the box. This short shaft has a bevel gear 245 fast thereon meshing with and driving opposed bevel gears 247 and 249 having hubs journaled loosely on the shaft 67 connected to the flexible, extensible shaft referred to, projecting from the standard to the knee.

To impart rotation from the hub of the spiral gear 241 to the short shaft 243, said hub may be provided with a pawl 253 (Figs. 13 and 15) mounted in a recess in said hub fast on a shaft 255 journaled in said hub. This pawl may engage ratchet teeth 257 on the short shaft 243.

At times the short shaft is driven more rapidly than the spiral gear hub. To eliminate objectionable noise from the clicking of the pawl as the ratchet wipes past the same, the pawl shaft may have a wedge-shaped block 259 fast thereon located between the arms of a yoke 261 embracing the short shaft. When the latter rotates more rapidly than the spiral gear, the friction of the short shaft on the yoke will rock the same and shift the block so that a face thereof rocks away from one arm of the yoke and the opposite face is brought into engagement with the other arm of the yoke. This movement rocks the pawl out of engagement with the ratchet. When the spiral gear hub rotates more rapidly than the short shaft, the frictional drag of the shaft on the yoke will rock the latter in the opposite direction and cause the pawl to reëngage the ratchet.

The bevel gear 245 rotates the opposed bevel gears 247 and 249 in opposite directions. Either of these opposed gears may be connected to the shaft 67 according to the direction of feed desired. To accomplish this, a clutch 263 may be splined to the shaft 67 between the opposed bevel gears. To shift this clutch to connect said gears alternatively to said shaft, a double bell crank lever 265 may be pivotally mounted on the box, and may have a yoke 267 engaging a circumferential groove in said clutch, and oppositely projecting arms 269 carrying rollers 271. To rock the bell crank, a sliding bar 273 (Figs. 1 and 10) is mounted in lugs on the outer face of the box and provided with dogs 275 having cam faces for engagement with the roller on the arms of said bell crank. When the bar is shifted to the left (Fig. 10) it will rock the double bell crank in a clockwise direction to shift the clutch to connect the bevel gear 247 with the shaft 67. When the bar is shifted to the right of Fig. 10, it will rock the bell crank in a contraclockwise direction to shift the clutch and connect the bevel gear 249 with the shaft 67.

To shift the bar as desired, it may be pivotally connected to one end of a link 277 (Fig. 1) the opposite end of which is pivotally connected to an arm 279 fast on the lower end of a vertical shaft 281 journaled in bearings in said standard, and extending upward somewhat above the top of said standard to receive the hub 283 of a controlling handle 285. To connect the handle with said shaft, its hub and a sleeve 287 fast on said shaft may have interengaging clutch teeth 289 (Fig. 3). The handle hub may slide axially to open the clutch and permit the handle to be turned to a position conveniently accessible from the station of the operator. Then it may be lowered to close the clutch and become effective to turn the shaft and through the connections described shift the clutch for controlling the direction of feed.

To determine the positions of adjustment of the handle appropriate for shifting the clutch for controlling the direction of feed, a disk 291 (Figs. 2 and 3) may be formed on the sleeve on the handle shaft, and have a pair of notches 293 and 295 therein coöperating with the tapered end of a spring pressed plunger 297 mounted in a recess in said standard. The notches are separated by a short projection 299 so that the disk may be readily rocked to cause the projection to ride over the plunger, but further rotation of the disk is opposed by the engagement of the plunger with the deep tapered walls at the outer sides of said notches.

Next will be described mechanism whereby the knee, saddle and table, or any of them, may be given a rapid traverse, for example, more rapid than the speed of feed obtained by the speed change mechanism in the feed box. To accomplish this, a rapid driver, in the present instance of the invention, in the form of a pulley 301 (Figs. 1 and 10) is provided and may be driven by a belt 302 from a pulley 303 on the spindle 5 or from other suitable source of power. This pulley has a web 304 on a hub 305 loosely journaled on a boss bearing 307 projecting outwardly from the box.

To connect the pulley with the bevel gear 247, referred to, the hub 247ª of said gear may be extended outward through the boss bearing and be secured to a hub 308 carrying a drum 309 containing sections 311 of an expansible ring, said sections being on curved arms 313 projecting outward from a plate 314 secured by screws 314ª to the web of said pulley. The sections of said ring may be expanded into frictional engagement with the inner surface of said drum by expanding devices 315 similar to those described in my Patent No. 1,288,563, Dec. 24, 1918. These devices have arms 317 projecting inward carrying screws 319 adapted to be engaged by a cone 321 slidably mounted on the hub of said pulley. When the cone is shifted to the left of Fig. 10, it will expand the ring sections into frictional engagement with said drum. To shift said cone, it may have a circumferential groove receiving a yoke 323 forming one arm of a bell crank 325 pivotally mounted on said box and having an arm carrying a roller 327 at the free end thereof.

This bell crank may be desirably controlled by the controlling device for the clutch for controlling the direction of feed. To accomplish this, the slidable bar 273 referred to, of said device may be provided with dogs 329 having cam faces inclined in opposite directions and located at opposite sides of the roller of said bell crank arm.

The construction is such that after the handle 285 has been turned to connect the clutch with either of the oppositely rotating bevel gears 247 and 249, it may be given a further movement, thereby causing the bell crank to rock in a contraclockwise direction (Fig. 10) and operate the friction clutch to connect the pulley with the bevel gear 247. Thus, the mechanism provides that the clutch will be thrown to control the direction of rotation before the rapid feed is brought into play.

When the pulley is rendered effective to rotate the bevel gear 247, the latter will drive the shaft 67 which in turn will drive the flexible, extensible shaft and through the mechanism in the knee impart a rapid traverse to the knee, saddle and table, or any of them, as desired.

When the pulley is connected in to produce the rapid traverse, the bevel gear 247 will rotate the bevel gear 245 referred to, and the latter in turn will rotate the shaft 243, spiral gear 241, spiral gear 239 and the short shaft 237 having the ratchet teeth referred to. The rapid rotation imparted to this shaft will cause the ratchet teeth to wipe past the pawl without interruption in the operation of the speed change mechanism in the feed box. Thus, the rapid traverse is obtained independently of the speed change mechanism in the feed box. This is an important feature, since it permits the rapid traverse to be quickly brought into play without interruption of the speed change mechanism or adjustment of the gears thereof to change the speed obtained by said mechanism.

The controlling handle at the top of the standard, as stated, may be adjusted for the purpose of controlling the direction of feed, and also for the purpose of connecting in the pulley for the rapid traverse. When it is desired to connect in the pulley, it is merely necessary to shift the handle slightly beyond its position for obtaining the direction of feed. This movement of the handle will cause the tapered end of the spring-pressed plunger 297 to wipe outward along the tapered outer wall of the disk notch which it engages, but without escape from said wall (Fig. 3ᵇ). As a consequence, on the release of the handle the plunger will be forced by its spring inward (Fig. 3ª), and thereby rotate the disk somewhat, sufficiently to open the friction clutch for the rapid traverse pulley. This opening of the clutch will be assisted by the inherent resilience of the arms which connect the sections of the ring with the hub of the clutch.

It is believed that the operation of the machine will be readily understood from the foregoing description.

It will be understood that the invention is not limited to the specific embodiment shown, but that various deviations may be made therefrom without departing from the spirit and scope of the appended claims.

Claims:

1. In combination, a standard, a work support mounted thereon, a work feed variable speed mechanism, a transmission from said mechanism to said work support, a rapid traverse driver, and means to connect said driver to said transmission to rotate the latter without alteration in the speed adjustment of said work feed mechanism.

2. In combination, a standard, a work support mounted thereon, a work feed driver, a rapid feed driver rotated more rapidly than said work feed driver, a transmission mechanism from said drivers to said work support, and means alternatively to render said drivers effective to rotate said mechanism and feed said support.

3. In combination, a standard, a work support mounted thereon, a work feed variable speed mechanism, a transmission for communicating movement from said mechanism to said work support, a driver and means to connect said driver with said transmission to impart movement to said work support independently of said variable speed mechanism.

4. In combination, a standard, a work support mounted thereon, a work feed variable speed mechanism mounted on said standard, a transmission for communicating motion from said mechanism to said support, a rapid feed driver mounted on said standard, and means to cause said driver or said variable speed mechanism, to operate said transmission at will.

5. In combination, a standard, a knee mounted thereon, a saddle mounted on said knee, and means to move said knee and saddle relatively to said standard and relatively to one another including a variable speed mechanism and a transmission for imparting a working feed to said knee and saddle, and means independent of said mechanism for imparting a rapid feed to said knee and saddle through said transmission.

6. In combination, a standard, a work support thereon, speed change means and a transmission for feeding said support relatively to said standard, means to feed said support through said transmission independently of said speed change means, and a controlling member operable to bring either of said means into play at will.

7. In combination, a standard, a work support mounted thereon, variable speed means and a transmission to impart a working feed to said support relatively to said standard, means including a rapid driver cooperating with said transmission to impart a rapid feed to said support, and a mechanism common to both of said means for controlling the direction of feed of said support.

8. In combination, a standard, a work support mounted thereon, variable speed means connections to impart a working feed to said support relatively to said standard, means operating through said connections to impart a rapid feed to said support, and means including a clutch common to both of said means for controlling the direction of feed of said support.

9. In combination, a standard, a work support mounted thereon, a shaft, and oppositely rotating gears loosely mounted on said shaft; a work feed mechanism for rotating said shaft; a clutch for connecting either of said gears with said shaft; and means to impart a rapid feed to one of said gears independently of said work feed mechanism.

10. In combination, a standard, a work support mounted thereon, a shaft, oppositely rotating gears loosely mounted thereon, work feed means to rotate said shaft, a clutch for connecting either of said gears to said shaft, and means including a friction clutch for imparting rapid rotation to said shaft independently of said work feed means.

11. In combination, a standard, a work support mounted thereon, means for feeding said support relatively to said standard including a shaft, slow and relatively rapid power means for driving said shaft, and transmission means between said slow power means and said shaft having provision permitting the driving of said shaft from said rapid power means without interrupting the operation of said slow power means.

12. In combination, a standard, a work support mounted thereon, and means to feed said support relatively to said standard including a shaft, slow and rapid power means for driving said shaft, and pawl and ratchet transmission means between said slow power means and said shaft permitting driving of the latter by the rapid power means without interruption of the slow power means.

13. In combination, a standard, a work support mounted thereon, slow and rapid power means, and means to transmit power therefrom to said support including pawl and ratchet means permitting simultaneous rotation of both of said power means.

14. In combination, a standard, a work support mounted thereon, slow and rapid driving means, means to transmit power from the latter to said support including a pawl, a ratchet, and means to automatically hold said pawl away from said ratchet when said support is driven by said rapid driving means.

15. In combination, a standard, a work support mounted thereon, variable speed means and rapid driving means, and means to transmit power therefrom to said support including a shaft, oppositely rotated gears on said shaft, a clutch for connecting either of said gears to said shaft, and a controlling member for operating said clutch and rendering said rapid power means effective to drive said shaft.

16. In combination, a standard, a work support movably mounted thereon, driving means and connections to impart a working feed to said support, means operating through said connections to impart a rapid traverse to said support, and means including a controlling member for determining the direction of feed of said support and for rendering either of said feed means operable to move said support.

17. In combination, a standard, a work-support movably mounted thereon, driving means and a transmission to impart a working feed to said support, means operating through said transmission to impart a rapid traverse feed to said support, and means for rendering either of said feed means effective including a shaft, a handle mounted on said shaft, and means to couple said handle to said shaft permitting adjustment of the former to suit the station of the operator.

18. In combination, a standard, a work support movably mounted thereon, driving means and a transmission to impart a working feed to said support, means operating through said transmission to impart a rapid traverse to said support, and means to render either of said feed means effective including a shaft mounted on said standard, a handle on said shaft, a member on said shaft having notches therein determining the direction of feed, and a spring-pressed plunger coöperating with said notches.

19. In combination, a standard, a work support movably mounted thereon, driving means and a transmission to impart a working feed to said support, means operating through said transmission to impart a rapid traverse to said support, clutch means coöperating with both of said feed means to control the direction of feed of said support, a member for shifting said clutch means, and an axially movable rod having dogs thereon to shift said member.

20. In combination, a standard, a work support movably mounted thereon, a driver for imparting a working feed to said support, a driver for imparting a rapid traverse to said support, transmission means connecting said drivers with said support including a clutch to control the direction of feed of said support, a clutch to render said rapid driver effective to feed said support, operating levers for said clutches, a controlling member, and dogs on said member for operating both of said levers to shift said clutches.

21. In combination, a standard, a work support movably mounted thereon, a driver for imparting a working feed to said support, a driver for imparting a rapid traverse to said support, transmission means connecting said drivers with said support including a clutch to control the direction of feed of said support, a clutch to render said rapid driver effective to feed said support, operating levers for said clutches, a controlling member, and dogs arranged on said member to progressively operate said clutches.

22. In combination, a standard, a work support movably mounted thereon, a driver for imparting a working feed to said support, a driver for imparting a rapid traverse to said support, transmission means connecting said drivers with said support including a clutch to control the direction of feed of said support, a clutch to render said rapid driver effective to feed said support, operating levers for said clutches, and means to shift said first named clutch in opposite directions to control the direction of feed and having provision for rendering said second named clutch effective after movement of said first named clutch in either direction.

23. In combination, a standard, a work support movably mounted thereon, a driver for imparting a working feed to said support, a driver for imparting a rapid traverse to said support, transmission means connecting said drivers with said support including a clutch to control the direction of feed, a clutch to render said rapid driver effective, and a controlling rod for said clutches having a preliminary movement to control said direction clutch and a further movement to connect said rapid driver clutch.

24. In combination, a standard, a work support movably mounted thereon, a driver to impart a working feed to said support, a driver to impart a rapid traverse to said support, transmission means connecting said drivers with said support including a clutch for controlling the direction of feed, a clutch for rendering said rapid driver effective to feed said support, and means for controlling said clutches having means for automatically opening said rapid driver clutch.

25. In combination, a standard, a knee, a saddle mounted on said knee, a table mounted on said saddle, a sleeve mounted in said saddle, a journal box carried by said sleeve, a feed screw for said saddle projecting through said box, a sleeve nut on said screw secured to said box, and means to rotate said feed screw.

26. In combination, a standard, a knee mounted thereon, a saddle mounted on said knee, a table mounted on said saddle, a sleeve bracket mounted in said saddle having a groove therein, a journal box mounted in said groove, a feed screw for said saddle projecting through said box, a nut on said screw secured to said box, and means to rotate said screw.

27. In combination, a standard, a knee, a saddle and table mounted thereon, a bracket mounted in said saddle, a journal box carried by said bracket, a feed screw for said saddle projecting through said box, a nut on said screw secured to said box, a feed screw for said table, and means to drive said feed screw including a sleeve on said saddle feed screw and in said box, a gear on one end of said sleeve, a bevel gear on said sleeve, a shaft in said bracket, and a bevel gear thereon meshing with said sleeve bevel gear.

28. In combination, a standard, a knee, a saddle and table mounted thereon, a sleeve bracket in said saddle, a box extending transversely across the lower end of said sleeve bracket, a feed screw for said saddle projecting through said box, a feed screw for said table, and means to drive the same including a sleeve on said saddle feed screw and journaled in said box, a gear on said sleeve, a bevel gear on said sleeve projecting through said box, a shaft in said sleeve bracket projecting toward said table feed screw, and a bevel gear thereon meshing with said sleeve gear.

29. In combination, a standard, a knee, a saddle and table mounted thereon, a bracket in said saddle, a box carried by said bracket, a feed screw for said saddle projecting through said box, a nut on said feed screw secured to said box, a feed screw for said table, and means to drive the same including a wide faced gear mounted in said knee, a sleeve on said saddle feed screw journaled in said box, a pinion on said sleeve meshing with said wide-faced gear, a shaft journaled in said bracket, a bevel gear thereon, and a bevel gear on said saddle feed screw sleeve meshing therewith.

30. In combination, a standard, a knee and a saddle mounted thereon, a screw for elevating said knee, a screw for feeding said saddle along said knee, a bevel gear on said elevating screw, a bevel gear meshing therewith, a driving gear for said bevel gears, a gear on said saddle feed screw, a driving gear meshing therewith, and a gear shiftable to rotate either of said driving gears at will.

31. In combination, a standard, a knee and a saddle mounted thereon, an elevating screw for said knee, a feed screw for said saddle, driving gears for said screws, and a single gear shiftable to mesh with and rotate either of said driving gears at will.

32. In combination, a standard, a knee and a saddle mounted thereon, an elevating screw for said knee, a feed screw for said saddle, driving gears for said screws respectively, a gear shiftable to mesh with either of said gears to rotate the same, and controlling means for said shiftable gear accessible for operation externally of said knee.

33. In combination, a standard, a knee and a saddle mounted thereon, an elevating screw for said knee, a feed screw for said saddle, driving gears for said screws respectively, a gear shiftable to mesh with and rotate said driving gears alternatively, a shaft for said shiftable gear, and clutch means for controlling the driving and arresting of said shaft.

34. In combination, a standard, a knee and a saddle mounted thereon, an elevating screw for said knee, a feed screw for said saddle, a shaft for driving both of said screws, and a single clutch for controlling the driving and arresting of both of said screws.

35. In combination, a standard, a knee and a saddle mounted thereon, an elevating screw for said knee, a feed screw for said saddle, driving gears for said screws, a shiftable gear alternatively to rotate either of said driving gears, a shaft for rotating said shiftable gear, a clutch for said shaft, and means operable on movement of said knee or saddle to open said clutch and arrest said knee or saddle.

36. In combination, a standard, a knee and a saddle mounted thereon, an elevating screw for said knee, a feed screw for said saddle, driving gears for said screws, a shiftable gear alternatively to rotate either of said driving gears, a shaft for said shiftable gear, clutch means for said shaft, and manually operable means for controlling said clutch.

37. In combination, a standard, a knee and a saddle mounted thereon, an elevating screw for said knee, a feed screw for said saddle, driving gears for said screws, a shiftable gear alternatively to rotate either of said driving gears, a shaft for said shiftable gear, clutch means for said shaft, manually operable means for controlling said clutch, and means automatically operable on movement of said knee or saddle for opening said clutch.

38. In combination, a standard, a knee and a saddle mounted thereon, an elevating screw for said knee, a feed screw for said saddle, means to rotate said screws including a flexible, extensible shaft extending from said standard to said knee, driving gears for said screws respectively, a shiftable gear alternatively to rotate either of said driving gears, a shaft for said shiftable gear, gearing extending from said flexible, extensible shaft to said shiftable gear shaft, and clutch means to connect said gearing with said shaft.

39. In combination, a standard, a knee and a saddle mounted thereon, an elevating screw for said knee, a feed screw for said saddle, driving gears for said screws respectively, a shiftable gear alternatively to rotate either of said driving gears, a shaft for said shiftable gear, a clutch for said shaft, a toothed element connected with said clutch, a pair of dogs on said saddle, a pair of dogs on said standard, a rack member for transmitting movement from said saddle dogs to said toothed element, and a rack member for transmitting movement from said standard dogs to said toothed element.

40. In combination, a standard, a knee and a saddle mounted thereon, an elevating screw for said knee, a feed screw for said saddle, driving gears for said screws respectively, a shiftable gear alternatively to rotate either of said driving gears, a shaft for said shiftable gear, a clutch for said shaft, a toothed element connected with said clutch, a pair of dogs on said saddle, a pair of dogs on said standard, a rack member for transmitting movement from said saddle dogs to said toothed element, a rack member for transmitting movement from said standard dogs to said toothed element, and means coöperating with said toothed element to hold said clutch in its open and closed positions.

41. In combination, a standard, a knee, saddle and table mounted thereon, a feed screw for said table, means operating through said saddle for rotating said screw, a clutch for said feed screw, and controlling means for said clutch including a yoke, a sliding rack connected to said yoke, a shaft having a toothed portion meshing with said rack, a toothed sector on said shaft, a rack plunger meshing with said sector, and dogs on said table for operating said plunger to shift said clutch.

42. In combination, a standard, a knee and a table mounted thereon, a feed screw for said table, a clutch for controlling the drive of said screw, and means for operating said clutch including a shaft, a toothed element mounted thereon, a rack plunger meshing with said element, dogs on said table for operating said plunger, a tapered element on said shaft, and a spring-pressed plunger coöperating with said tapered element to hold said clutch in different positions of adjustment.

43. In combination, a standard, a knee and a table thereon, a feed screw for said table, a clutch for controlling said feed screw, and means for operating said clutch including a shaft having a toothed element thereon, a toothed plunger meshing with said rack, dogs on said table for causing said plunger to turn said shaft, means for holding said shaft in different positions of adjustment, and a handle on said shaft for operating the same.

44. In combination, a standard, a knee and a table mounted thereon, a feed screw for said table, a clutch for controlling said feed screw, and means to operate said clutch including a yoke, a sliding rack bar connected to said yoke, a shaft having a toothed element meshing with said rack bar, a second toothed element on said shaft, a rack plunger meshing with said element, and dogs on said table for moving said plunger to operate said clutch.

45. In combination, a standard, a knee movably mounted thereon, a work support on said knee, a vertical feed screw shaft for said knee, a horizontal feed screw for said work support, and means to drive said horizontal feed screw, including a horizontal shaft mounted in said knee beneath the upper end of said vertical feed screw shaft.

46. In combination, a standard, a knee movably mounted thereon, a work support on said knee, a vertical feed screw shaft for said knee, a horizontal feed screw for said work support, a gear on said horizontal feed screw, a horizontal driving shaft mounted in the knee and extending transversely to said vertical feed screw shaft beneath the upper end thereof, and a gear on said driving shaft for driving the gear on said horizontal feed screw.

47. In combination, a standard, a knee movably mounted thereon, a work support on said knee, a vertical feed screw shaft for said knee, a horizontal feed screw shaft for said work support above said vertical shaft, a horizontal driving shaft mounted in said knee beneath the upper end of said vertical shaft, and gearing to transmit rotation from said driving shaft to said horizontal feed screw shaft.

48. In combination, a standard, a work support mounted thereon, a feed box mounted on said standard, a work feed driver and a rapid traverse driver on said box, speed change mechanism in said box actuated by said work feed driver, and means to transmit power from said speed change mechanism and rapid traverse driver to said work support.

49. In combination, a standard, a work support mounted thereon, a work feed driver, a feed box on said standard, speed change mechanism in said box driven by said driver and comprising sets of different sized gears, a tumbler carrying one of said sets of gears adjustable to bring the latter selectively into mesh with the other set of different sized gears, a shaft driven by said gears; means to transmit power from said shaft to said work support, and rapid traverse means to rotate said shaft independently of said speed change mechanism.

50. In combination, a standard, a work support mounted thereon, speed change mechanism comprising sets of different sized gears, means to bring one of said sets of gears selectively into mesh with the other set of gears, a shaft driven by said gears; means to transmit power from said shaft to said work support, and rapid traverse means to rotate said shaft independently of said speed change mechanism.

51. In combination, a standard, a work support mounted thereon, speed change mechanism comprising sets of different sized gears, means to bring one of said sets of gears selectively into mesh with the other set of gears, gear means to double the number of speeds obtained by said sets of gears; a shaft driven by the latter, means to transmit power from said shaft to the work support, and rapid traverse means to rotate said shaft independently of said speed change mechanism.

52. In combination, a standard, a work support mounted thereon, speed change mechanism comprising sets of different sized gears, means to bring one of said sets of gears selectively into mesh with the other set of gears, gear means to multiply the number of speeds obtained by said different sized gears, manually operable means to control said gear means, a shaft driven by said gears, means to transmit power from said shaft to said work support, and rapid traverse means to rotate said shaft independently of said speed change mechanism.

53. In combination, a standard, a work support mounted thereon, speed change mechanism comprising sets of different sized gears, means to bring one of said sets of gears selectively into mesh with the other set of gears, spiral gears driven by said sets of gears, a shaft for one of said spiral gears, a bevel gear on said shaft, bevel gears oppositely rotated by said first named bevel gear, a driven shaft for said oppositely rotated bevel gears, clutch means to connect the latter to their shaft, means to transmit power from the latter to said work support, and rapid traverse means to rotate said driven shaft independently of said speed change mechanism.

In testimony whereof, I have signed my name to this specification.

WILLIAM F. GROENE.